(12) United States Patent
Kan et al.

(10) Patent No.: US 12,341,928 B2
(45) Date of Patent: *Jun. 24, 2025

(54) CONTACT CENTER SYSTEM

(71) Applicant: Afiniti AI Limited, Dublin (IE)

(72) Inventors: Ittai Kan, McLean, VA (US); Ain Chishty, Rockville, MD (US); Blake Jay Riley, Indianapolis, IN (US); Zia Chishti, San Juan, PR (US)

(73) Assignee: AFINITI AI LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,903

(22) Filed: Oct. 19, 2023

(65) Prior Publication Data

US 2024/0129407 A1   Apr. 18, 2024

Related U.S. Application Data

(63) Continuation of application No. 17/846,748, filed on Jun. 22, 2022, now Pat. No. 11,831,808, which is a continuation-in-part of application No. 17/191,028, filed on Mar. 3, 2021, now Pat. No. 11,595,522, which is a continuation of application No. 17/113,715, filed on Dec. 7, 2020, now abandoned, which is a continuation of application No. 16/445,014, filed on Jun. 18, 2019, now Pat. No. 10,863,026, which is a continuation of application No. 15/395,529, filed on Dec. 30, 2016, now Pat. No. 10,326,882.

(51) Int. Cl.
*H04M 3/00* (2024.01)
*H04M 3/51* (2006.01)
*G06Q 10/0631* (2023.01)

(52) U.S. Cl.
CPC .. *H04M 3/5175* (2013.01); *G06Q 10/063112* (2013.01); *H04M 2203/402* (2013.01)

(58) Field of Classification Search
CPC ............ H04M 3/5175; H04M 3/5191; H04M 3/5233; H04M 3/5133
See application file for complete search history.

(56) References Cited

U.S. PATENT DOCUMENTS

| 5,155,763 A | 10/1992 | Bigus et al. |
| 5,206,903 A | 4/1993 | Kohler et al. |

(Continued)

FOREIGN PATENT DOCUMENTS

| AU | 2008349500 | 5/2014 |
| AU | 2009209317 | 5/2014 |

(Continued)

OTHER PUBLICATIONS

Statement on Inventorship Dispute with Exhibits 1-15 (Jul. 17, 2023) (19 pages).

(Continued)

*Primary Examiner* — Rasha S Al Aubaidi
(74) *Attorney, Agent, or Firm* — Rothwell, Figg, Ernst & Manbeck, P.C.

(57) ABSTRACT

A pairing module comprising a memory storing contact center information that i) identifies a first set of available agents that are available to be paired with a contact and ii) identifies a first set of available contacts that are waiting to be paired with an available agent. The pairing module further comprises a contact/agent (C/A) pair selector that functions occasionally read the memory to obtain contact center information and then use the obtained contact center information to pair available agents with available contacts.

18 Claims, 9 Drawing Sheets

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,044,355 A | 3/2000 | Crockett et al. |
| 6,044,468 A | 3/2000 | Osmond |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,493,446 B1 | 12/2002 | Cherry |
| 6,496,580 B1 | 12/2002 | Chack |
| 6,504,920 B1 | 1/2003 | Okon et al. |
| 6,519,335 B1 | 2/2003 | Bushnell |
| 6,535,600 B1 | 3/2003 | Fisher et al. |
| 6,535,601 B1 | 3/2003 | Flockhart et al. |
| 6,570,980 B1 | 5/2003 | Baruch |
| 6,577,727 B1 | 6/2003 | Hymel |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,970,829 B1 | 11/2005 | Leamon |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,577,706 B1 | 11/2013 | Aykin |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,923,504 B1 | 12/2014 | Bracco et al. |
| 8,929,537 B2 | 1/2015 | Chishti et al. |
| 8,935,172 B1 | 1/2015 | Noble, Jr. |
| 8,938,063 B1 | 1/2015 | Hackbarth |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,692,899 B1 | 6/2017 | Rizvi |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| 9,955,013 B1 | 4/2018 | Chishti |
| 10,027,812 B1 | 7/2018 | Kan et al. |
| RE46,986 E | 8/2018 | Chishti et al. |
| 10,116,800 B1 | 10/2018 | Kan et al. |
| 10,135,987 B1 | 11/2018 | Chishti et al. |
| RE47,201 E | 1/2019 | Chishti et al. |
| 10,284,727 B2 | 5/2019 | Kan et al. |
| 10,326,882 B2 | 6/2019 | Chishti |
| 10,404,861 B2 | 9/2019 | Kan et al. |
| 10,567,586 B2 | 2/2020 | Xie et al. |
| 10,863,026 B2 | 10/2020 | Chishti |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |

(56) References Cited

U.S. PATENT DOCUMENTS

| | | |
|---|---|---|
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0061183 A1 | 3/2007 | Seetharaman |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2007/0291922 A1 | 12/2007 | Matteo et al. |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0109797 A1 | 5/2008 | Khetarpal et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0206199 A1 | 8/2011 | Arora |
| 2012/0051536 A1 | 3/2012 | Chishti et al. |
| 2012/0051537 A1 | 3/2012 | Chishti et al. |
| 2012/0087486 A1 | 4/2012 | Guerrero |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0251137 A1 | 9/2013 | Chishti et al. |
| 2013/0251138 A1 | 9/2013 | Spottiswoode et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0237208 A1 | 8/2015 | Chishti et al. |
| 2015/0281448 A1 | 10/2015 | Putra et al. |
| 2016/0080573 A1 | 3/2016 | Chishti |
| 2016/0171422 A1 | 6/2016 | Wicaksono |
| 2017/0013131 A1 | 1/2017 | Craib |
| 2017/0064080 A1 | 3/2017 | Chishti et al. |
| 2017/0064081 A1 | 3/2017 | Chishti et al. |
| 2017/0126893 A1 | 5/2017 | Boutcher et al. |
| 2017/0316438 A1 | 11/2017 | Konio et al. |
| 2018/0159977 A1 | 6/2018 | Danson et al. |
| 2018/0191898 A1 | 7/2018 | Chishti |
| 2018/0191902 A1 | 7/2018 | Chishti |
| 2018/0191904 A1 | 7/2018 | Chishti |
| 2018/0316793 A1 | 11/2018 | Kan et al. |
| 2018/0316794 A1 | 11/2018 | Kan et al. |
| 2019/0222697 A1 | 7/2019 | Kan et al. |
| 2019/0306316 A1 | 10/2019 | Chishti |
| 2021/0092230 A1 | 3/2021 | Chishti |

FOREIGN PATENT DOCUMENTS

| | | |
|---|---|---|
| AU | 2009311534 | 8/2014 |
| AU | 2015243001 | 11/2015 |
| CN | 102457623 A | 5/2012 |
| CN | 102301688 | 5/2014 |
| CN | 102017591 | 11/2014 |
| CN | 104202492 A | 12/2014 |
| CN | 104778532 A | 7/2015 |

(56) References Cited

FOREIGN PATENT DOCUMENTS

| | | |
|---|---|---|
| CN | 104854829 A | 8/2015 |
| CN | 105100517 A | 11/2015 |
| EP | 0493292 | 7/1992 |
| EP | 0949793 | 10/1999 |
| EP | 1032188 | 8/2000 |
| JP | 11-098252 | 4/1999 |
| JP | 2000-078291 | 3/2000 |
| JP | 2000-078292 | 3/2000 |
| JP | 2000-092213 | 3/2000 |
| JP | 2000-236393 | 8/2000 |
| JP | 2001-292236 | 10/2001 |
| JP | 2001-518753 | 10/2001 |
| JP | 2002-297900 | 10/2002 |
| JP | 3366565 | 1/2003 |
| JP | 2003-187061 | 7/2003 |
| JP | 2004-056517 | 2/2004 |
| JP | 2004-227228 | 8/2004 |
| JP | 2006-345132 | 12/2006 |
| JP | 2007-324708 | 12/2007 |
| JP | 2011-0511536 | 4/2011 |
| JP | 5421928 | 2/2014 |
| JP | 2014-207707 A | 10/2014 |
| JP | 5631326 | 11/2014 |
| JP | 5649575 | 1/2015 |
| JP | 2015-167279 A | 9/2015 |
| JP | 2019-205186 A | 11/2019 |
| MX | 316118 | 12/2013 |
| MX | 322251 | 7/2014 |
| NZ | 587100 | 10/2013 |
| NZ | 587101 | 10/2013 |
| NZ | 591486 | 1/2014 |
| NZ | 892781 | 3/2014 |
| PH | 1-2010-501704 | 2/2014 |
| PH | 1-2010-501705 | 2/2015 |
| WO | WO-1999/017517 | 4/1999 |
| WO | WO-00/70849 | 11/2000 |
| WO | WO-2001/063894 | 8/2001 |
| WO | WO-2006/124113 | 11/2006 |
| WO | 2007/055250 A1 | 5/2007 |
| WO | WO-2010/053701 | 5/2010 |
| WO | WO-2011/081514 | 7/2011 |
| WO | WO-2016/048290 | 3/2016 |

OTHER PUBLICATIONS

Canadian Office Action issued in Canadian Patent Application No. 2713526, dated Oct. 25, 2016 (7 pages).
India Examination Report issued in India Patent Application No. 7583/CHENP/2014, dated Jun. 27, 2019 (7 pages).
International Preliminary Report on Patentability issued in connection with PCT Application No. PCT/US2009/066254 mailed Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2017/001748 dated Aug. 1, 2018 (20 pages).
International Search Report and Written Opinion issued by the U.S. Patent and Trademark Office as International Searching Authority for International Application No. PCT/US17/66988 dated Jan. 29, 2018 (13 pages).
International Search Report issued in connection with International Application No. PCT/US13/33268 mailed May 31, 2013 (2 pages).
International Search Report issued in connection with PCT Application No. PCT/US/2009/054352 mailed Mar. 12, 2010 (5 pages).
International Search Report issued in connection with PCT Application No. PCT/US2008/077042 mailed Mar. 13, 2009 (3 pages).
International Search Report issued in connection with PCT Application No. PCT/US2009/031611 mailed Jun. 3, 2009 (5 pages).
International Search Report issued in connection with PCT Application No. PCT/US2009/066254 mailed Feb. 24, 2010 (4 pages).
International Search Report issued in connection with PCT/US2009/061537 mailed Jun. 7, 2010 (5 pages).
International Search Report issued in connection with PCT/US2013/033261 mailed Jun. 14, 2013 (3 pages).
International Search Report issued in connection with PCT/US2013/33265 mailed Jul. 9, 2013 (2 pages).
Japanese Office Action issued by the Japan Patent Office for Application No. 2015-503396 dated Jun. 29, 2016 (7 pages).
Subsequent Substantive Examination Report issued in connection with Philippines Application No. 1-2010-501705 mailed Jul. 14, 2014 (1 page).
Substantive Examination Report issued in connection with Philippines Application No. 1/2011/500868 dated May 2, 2014 (1 page).
Written Opinion of the International Searching Authority issued in connection with PCT Application No. PCT/US2008/077042 mailed Mar. 13, 2009 (6 pages).
Written Opinion of the International Searching Authority issued in connection with International Aoolication No. PCT/US13/33268 mailed May 31, 2013 (7 pages).
Written Opinion of the International Searching Authority issued in connection with PCT Application No. PCT/US/2009/054352 mailed Mar. 12, 2010 (5 pages).
Written Opinion of the International Searching Authority issued in connection with PCT Application No. PCT/US2009/031611 mailed Jun. 3, 2009 (7 pages).
Written Opinion of the International Searching Authority issued in connection with PCT Application No. PCT/US2009/066254 mailed Feb. 4, 2010 (5 pages).
Written Opinion of the International Searching Authority issued in connection with PCT/US2009/061537 mailed Jun. 7, 2010 (10 pages).
Written Opinion of the International Searching Authority issued in connection with PCT/US2013/033261 mailed Jun. 14, 2013 (7 pages).
Written Opinion of the International Searching Authority issued in connection with PCT/US2013/33265 mailed July 9. 2013 (7 pages).
English Translation of Japanese Office Action issued in Japanese Patent Application No. 2021-110562, dated Jan. 11, 2022 (6 pages).
Chinese Office Action issued in Chinese Patent Application No. 202110360089.2, dated Nov. 3, 2021 (19 pages).
Non-Final Office Action issued in U.S. Appl. No. 17/191,015 dated Apr. 23, 2021, 49 pages.
Non-Final Office Action issued in U.S. Appl. No. 17/191,000 dated May 26, 2021, 44 pages.
Anonymous. (2006) "Performance Based Routing in Profit Call Centers," The Decision Makers' Direct, located at www.decisioncraft.com, Issue Jun. 2002 (3 pages).
Cleveland, William S., "Robust Locally Weighted Regression and Smoothing Scatterplots," Journal of the American Statistical Association, vol. 74, No. 368, Dec. 1979, pp. 829-836 (8 pages).
Gans, N. et al. (2003), "Telephone Call Centers: Tutorial, Review and Research Prospects," Manufacturing & Service Operations Management, vol. 5, No. 2, pp. 79-141.
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Ntzoufras, "Bayesian Modeling Using Winbugs". Wiley Interscience, Chapter 5, Normal Regression Models, Oct. 18, 2007, Redacted version, pp. 155-220 (67 pages).
Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

(56) References Cited

OTHER PUBLICATIONS

Riedmiller, M. et al. (1993). "A Direct Adaptive Method for Faster Backpropagation Learning: The RPROP Algorithm," 1993 IEEE International Conference on Neural Networks, San Francisco, CA, Mar. 28-Apr. 1, 1993, 1:586-591.

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Ioannis Ntzoufras "Bayesian Modeling Using Winbugs an Introduction", Department of Statistices, Athens University of Economics and Business, Wiley-Interscience, A John Wiley & Sons, Inc., Publication, Chapter 5, Jan. 1, 2007, pp. 155-220 (67 pages).

CONTACT CENTER SYSTEM

CROSS-REFERENCE TO RELATED APPLICATIONS

This application is a continuation of U.S. application Ser. No. 17/846,748, filed on Jun. 22, 2022 (now U.S. Pat. No. 11,831,808, issued Nov. 28, 2023), which is a continuation-in-part (CIP) of U.S. application Ser. No. 17/191,028, filed on Mar. 3, 2021 (now U.S. Pat. No. 11,595,522, issued on Feb. 28, 2023), which is a continuation of U.S. application Ser. No. 17/113,715, filed on Dec. 7, 2020 (status abandoned), which is a continuation of U.S. application Ser. No. 16/445,014, filed on Jun. 18, 2019 (now U.S. Pat. No. 10,863,026, issued on Dec. 8, 2020), which is a continuation of U.S. application Ser. No. 15/395,529, filed on Dec. 30, 2016 (now U.S. Pat. No. 10,326,882, issued on Jun. 18, 2019). The above identified applications and patents are incorporated by this reference herein in their entirety.

TECHNICAL FIELD

This disclosure generally relates to pairing contacts and agents in contact centers.

BACKGROUND

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents based on time of arrival, and agents receive contacts based on the time when those agents became available. This strategy may be referred to as a "first-in, first-out," "FIFO," or "round-robin" strategy. In other typical contact centers, other strategies may be used, such as "performance-based routing," or a "PBR," strategy.

Typical contact centers preferentially minimize overall agent idle time and overall contact waiting time. To that end, if contacts are waiting in a queue, a contact will be assigned to an agent soon after an agent becomes available for assignment. Similarly, if agents are idle, waiting for contacts to arrive, an agent will be assigned to a contact soon after a contact becomes available for assignment.

However, if a contact center uses a pairing strategy that is designed to choose among multiple possible pairings, it may be inefficient to choose the first available pairing for the sake of minimizing contact hold time or agent idle time.

In view of the foregoing, it may be understood that there may be a need for a system that enables improving the amount of choice available to improve the efficiency and performance of pairing strategies that are designed to choose among multiple possible pairings.

SUMMARY

In one aspect a method is provided. The method includes, at a first time, obtaining first contact center information, the first contact center information: i) identifying a first set of available agents that are available to be paired with a contact and ii) identifying a first set of available contacts that are waiting to be paired with an available agent, the first set of available contacts comprising a first contact. The method also includes, after obtaining the first contact center information, performing a first pairing process using the first contact center information. The method also includes, at a second time after performing the first pairing process, obtaining second contact center information, the second contact center information: i) identifying a second set of available agents that are available to be paired with a contact, the second set of available agents comprising a first agent and ii) identifying a second set of available contacts that are waiting to be paired with an available agent, the second set of available contacts comprising the first contact. The method also includes, after obtaining the second contact center information, performing a second pairing process using the second contact center information, wherein the performance of the second pairing process results in a pairing of the first contact with the first agent. The method also includes, at a third time after performing the second pairing process, obtaining third contact center information, the third contact center information: i) identifying a third set of available agents that are available to be paired with a contact and ii) identifying a third set of available contacts that are waiting to be paired with an available agent. The method also includes after obtaining the third contact center information, performing a third pairing process using the third contact center information. The amount of time between the first time and the second time is: i) at least a predetermined threshold amount of time, ii) not more than a predetermined maximum amount of time, or iii) both, and the amount of time between the second time and the third time is: i) at least the predetermined threshold amount of time, ii) not more than the predetermined maximum amount of time, or iii) both.

In another aspect there is provided a system, where the system includes memory; and processing circuitry coupled to the memory. In some embodiments, the system is configured to, at a first time, obtain first contact center information, the first contact center information: i) identifying a first set of available agents that are available to be paired with a contact and ii) identifying a first set of available contacts that are waiting to be paired with an available agent the first set of available contacts comprising a first contact. The system is further configured to, after obtaining the first contact center information, perform a first pairing process, in a switch of the contact center, using the first contact center information. The system is further configured to, at a second time after performing the first pairing process, obtain second contact center information, the second contact center information: i) identifying a second set of available agents that are available to be paired with a contact, the second set of available agents comprising a first agent and ii) identifying a second set of available contacts that are waiting to be paired with an available agent, the second set of available contacts comprising the first contact. The system is further configured to, after obtaining the second contact center information, perform a second pairing process, in the switch of the contact center, using the second contact center information, wherein the performance of the second pairing process results in a pairing of the first contact with the first agent. The system is further configured to, at a third time after performing the second pairing process, obtain third contact center information, the third contact center information: i) identifying a third set of available agents that are available to be paired with a contact and ii) identifying a third set of available contacts that are waiting to be paired with an available agent. The system is further configured to, after obtaining the third contact center information, perform a third pairing process, in the switch of the contact center, using the third contact center information. The amount of time between the first time and the second time is: i) at least a predetermined threshold amount of time, ii) not more than a predetermined maximum amount of time, or iii) both, and the amount of time between the second time and the third time is: i) at least the predetermined threshold amount of time, ii) not more than the predetermined maximum amount of time, or iii) both.

In another aspect there is provided a computer program product comprising a non-transitory computer readable medium storing instructions which when executed by processing circuitry of a system causes the system to perform the above described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope as described herein, and with respect to which the present disclosure may be of significant utility.

BRIEF DESCRIPTION OF THE DRAWINGS

In order to facilitate a fuller understanding, reference is now made to the accompanying drawings, in which like elements are referenced with like numerals. These drawings should not be construed as limiting the present disclosure, but are intended to be illustrative only.

DETAILED DESCRIPTION

One example of a pairing strategy that is designed to choose among multiple possible pairings is a "behavioral pairing" or "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO and PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding pairing or matching modules using BP strategies (sometimes also referred to as "satisfaction mapping," "SATMAP," "routing system," "routing engine," etc.) is described in, for example, U.S. Pat. No. 8,879,715, which is incorporated herein by reference.

In some embodiments, a contact center may switch (or "cycle") periodically among at least two different pairing strategies (e.g., between FIFO and an L3 pairing strategy). Additionally, the outcome of each contact-agent interaction may be recorded along with an identification of which pairing strategy (e.g., FIFO, or BP enabled with L3) had been used to assign that particular contact-agent pair. By tracking which interactions produced which results, the contact center may measure the performance attributable to a first strategy (e.g., FIFO) and the performance attributable to a second strategy (e.g., BP with L3). In this way, the relative performance of one strategy may be benchmarked against the other. The contact center may, over many periods of switching between different pairing strategies, more reliably attribute performance gain to one strategy or the other. Benchmarking pairing strategies is described in, e.g., U.S. patent application Ser. No. 15/131,915, filed Apr. 18, 2016, which is incorporated herein by reference.

Figure 1:
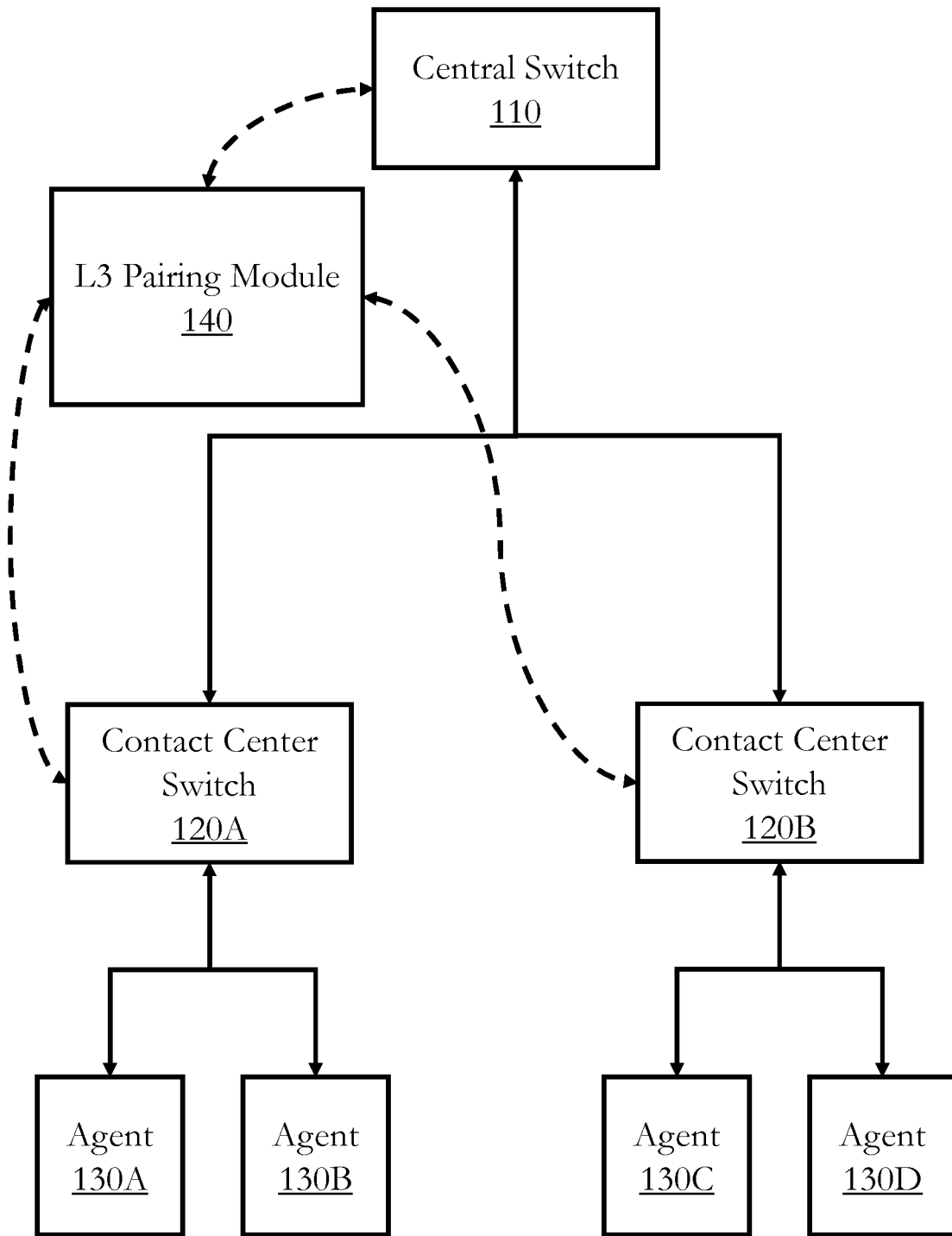
FIG. 1 shows a block diagram of a contact center according to embodiments.

FIG. 1 shows a block diagram of a contact center system 100 according to embodiments. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third party vendor. In the example of FIG. 1, L3 pairing module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple L3 pairing modules. In some embodiments, L3 pairing module 140 may be embedded within a component of a contact center system (e.g., embedded in or otherwise integrated with a switch). The L3 pairing module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of L3 pairing module 140 or one or more switches such as central switch 110 or contact center switches 120A and 120B. In some embodiments, an L3 pairing module may determine which pairing module may handle pairing for a particular contact. For example, the L3 pairing module may alternate between enabling pairing via the BP module and enabling pairing with the FIFO module. In other embodiments, one pairing module (e.g., the BP module) may be configured to emulate other pairing strategies. For example, an L3 pairing module, or an L3 pairing component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

Figure 2:
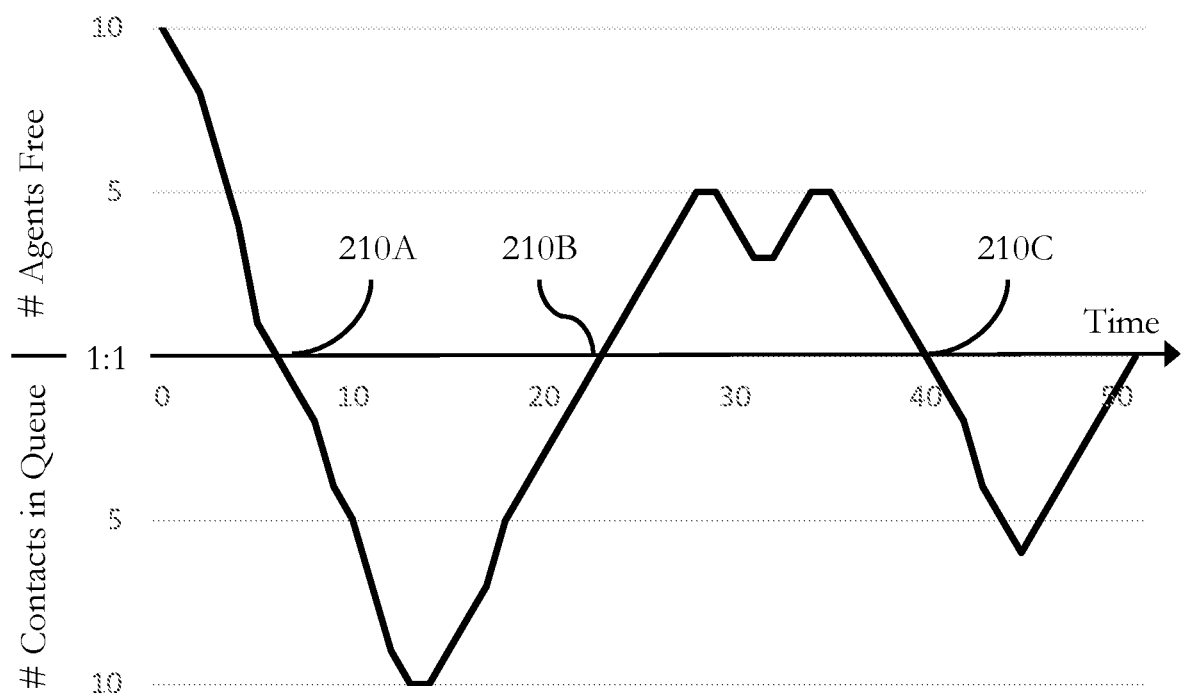
FIG. 2 depicts a schematic representation of a contact center system timeline according to embodiments.

FIG. 2 depicts a schematic representation of a contact center system timeline according to embodiments. In a given period of time (e.g., over several minutes, several hours, a day), the number of agents free or available to connect to contacts, or the number of contacts waiting in queue, will vary continuously as contacts arrive and depart the contact center system. The example of FIG. 2 depicts the capacity of a contact center system over a period of time along the x-axis from time "0" to time "50" (e.g., 0 minutes to 50 minutes). The y-axis depicts the number of free agents or the number of contacts in queue above and below the x-axis, respectively.

At time 0 (e.g., when the contact center first opens at the beginning of the day), there are 10 agents available and waiting for contacts to arrive. Periods of time when a contact center has a surplus of available agents are referred to as "L1" environments. If a choice-based pairing strategy such as BP is used, the choice-based pairing strategy may choose from among any (or a subset) of the available agents when a contact arrives.

As contacts arrive, and agents become occupied while communicating with those contacts, the number of available agents may decrease, as shown in FIG. 2 from time 0 to approximately time 5. The contact center is operating in an L1 environment for this entire duration, but the choice available to BP or another choice-based pairing strategy becomes increasingly limited-instead of having as many as ten (or more) agents available to choose among, by about time 5 there are only two or three agents to choose among.

At other periods of time, there may be a shortage of agents, and contacts begin to queue, waiting for agents to become available for connection, as shown in FIG. 2 from about time 7 to about time 21. Periods of time when a contact center has a shortage of available agents are referred to as "L2" environments. If a choice-based pairing strategy such as BP is used, the choice-based pairing strategy may choose from among any (or a subset) of the waiting contacts when an agent becomes available.

As agents become available to connect with contacts waiting in the queue, the size of the queue may decrease, as shown in FIG. 2 from approximately time 14 to about time 21. The contact center is operating in an L2 environment for this entire duration, but the choice available to BP or another choice-based pairing strategy becomes increasingly limited-instead of having as many as ten (or more) contacts available to choose among at about time 14, by about time 21 there are only two or three contacts in queue to choose among.

At some points in time, a contact center will transition from an L1 state to an L2 state (e.g., point 210A at about time 6 and point 210C at about time 40) or vice versa, from an L2 state to an L1 state (e.g., point 210B at about time 23). These crossover points along the x-axis (labeled the "1:1" line) occur when no choice is available to BP or another choice-based pairing strategy. For example, there may be a single contact waiting in queue, which may be paired with whichever agent happens to become free next. Or there may be a single agent waiting idle, which may be paired with whichever contact happens to arrive at the contact center next.

In some situations (not shown), a contact center may reach the "1:1" line and then bounce back up into L1 (or bounce back down into L2). No L1-to-L2 or L2-to-L1 transition occurs, but there is still a time at which no choice is available to BP.

In some situations (not shown), a contact center may remain along the "1:1" line for an extended period of time. In fact, a typical contact center may consider this line to indicate when the contact center is operating at a "perfect" capacity, with neither a surplus nor a shortage of agents for the given level of demand (e.g., number, frequency, and duration of contacts arriving at the contact center). In these situations, a BP pairing strategy could go for an extended period of time with no choices available other than the "1 agent:1 contact" default choice.

These points in time (or periods of time) when the contact center is operating along the "1:1" line, when a contact center has neither a surplus nor a shortage of available agents, are referred to as "L0" environments.

Figure 3:
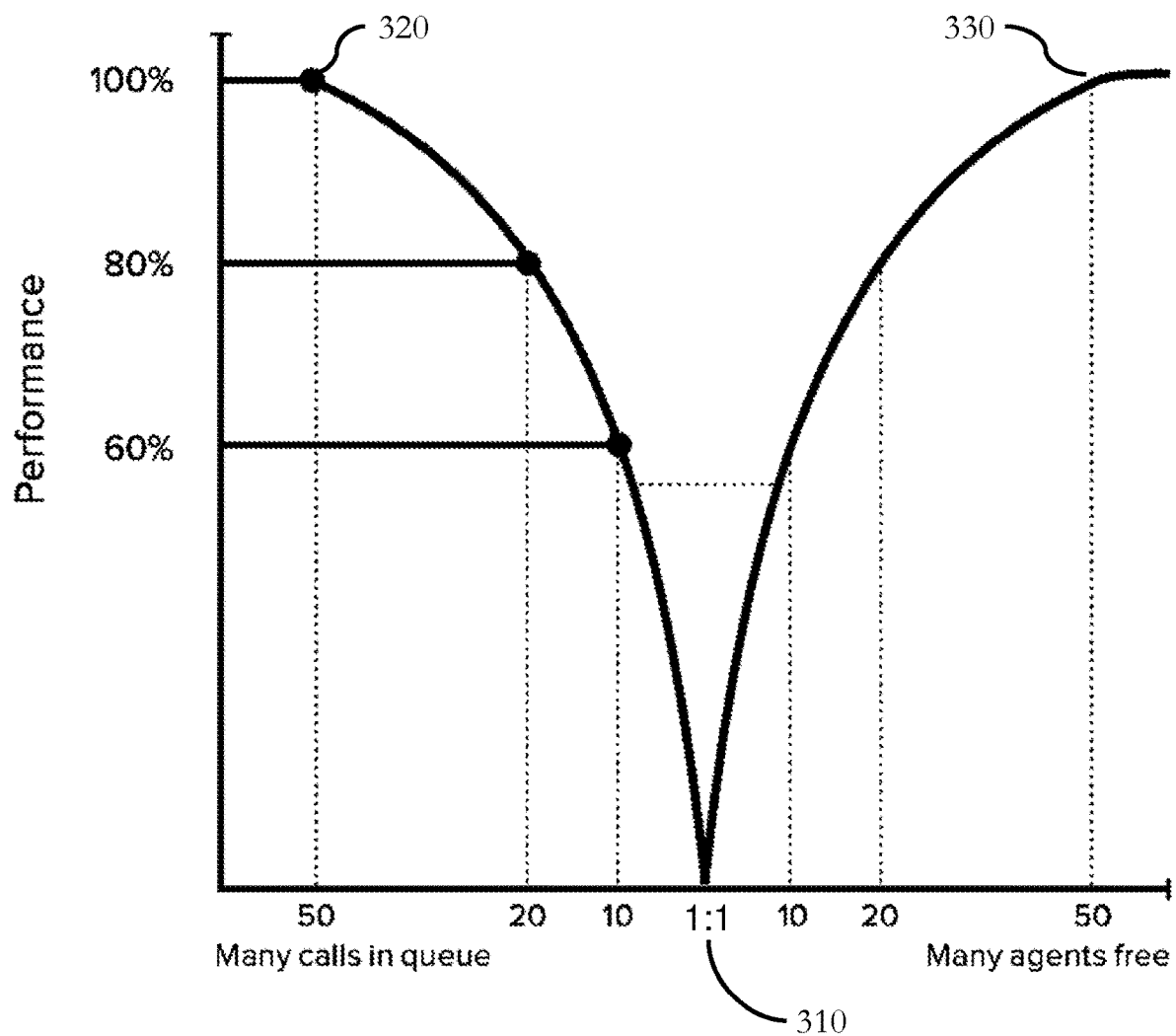
FIG. 3 depicts a schematic representation of a choice-based pairing strategy according to embodiments.

FIG. 3 depicts a schematic representation of a choice-based pairing strategy according to embodiments. When choice is limited, choice-based pairing strategies may suffer from suboptimal performance. FIG. 3 shows an example of a performance estimate or performance simulation of a choice-based pairing strategy. When there are many contacts in queue ("calls in queue" as in FIG. 3) (e.g., at point 320), or when there are many agents free (e.g., at point 330), BP or another choice-based pairing strategy may perform optimally (e.g., at or near "100%" instant performance or efficiency).

However, as the number of contacts in queue or free agents dwindle, there are fewer choices available to BP, and the performance or efficiency of BP could drop. In an L0 environment (e.g., at point 310), the instant performance or efficiency of BP is considered to be 0%, insofar as BP (without L3 pairing) is incapable of making a choice different from the pairing that any other non-L3 pairing strategy could make. In other words, if there is only one contact waiting for an agent, and only one agent waiting a contact, both FIFO and BP will pair that one contact with that one agent, with no other choice to make. As choice increases, either as contacts fill a queue in an L2 environment, or more agents become available in an L1 environment, performance steadily increases toward optimal instant performance.

In the example of FIG. 3, 50 calls in queue and 50 agents free are the points 320 and 330 at which this pairing strategy is expected to reach peak performance. However, in other embodiments or real-world contact center systems, peak performance may be reached at varying levels of agent shortage or surplus (e.g., greater than 3 choices available, greater than 7 choices available, greater than 20 choices available, etc.).

In situations such as L0 environments in which the choice available to BP is too limited, it may be advantageous to delay or otherwise postpone connecting an agent to a contact. Introducing a delay could allow time for another agent or another contact to become available. If a contact center is operating in L0, and a second agent arrives after the system delays the pairing between the first available agent and contact, the contact center will enter an L1 environment with two agents to choose between instead of being forced into the default selection. Similarly, if a contact center is operating in L0, and a second contact arrives after the system delays the pairing between the first available agent and contact, the contact center will enter an L2 environment with two contacts to choose between instead of being forced into the default selection.

In some embodiments, it may be desirable to delay even if the contact center already has some choice (e.g., already operating in L1 or L2), but the choice is limited. For example, if only ten contacts are waiting in queue when an agent becomes available, the pairing strategy of FIG. 3 is expected to have an instant performance of only 60%. It may be desirable to delay until closer to twenty contacts are waiting, at which point the expected instant performance would be closer to 80%.

When a delay is permitted, it is possible to enter a hybrid environment that is neither pure L1 nor pure L2. For example, consider a contact center in which there are two contacts in queue, and only one agent is available. Following a delay, a second agent could become available, resulting in an environment in which there are multiple contacts in queue and multiple agents available for connection. Periods of time when a contact center has multiple contacts in queue and multiple free agents are referred to as "L3" environments. In the present disclosure, an L3 pairing module is a pairing module capable of causing and handling L3 environments within a contact center system.

Figure 4:
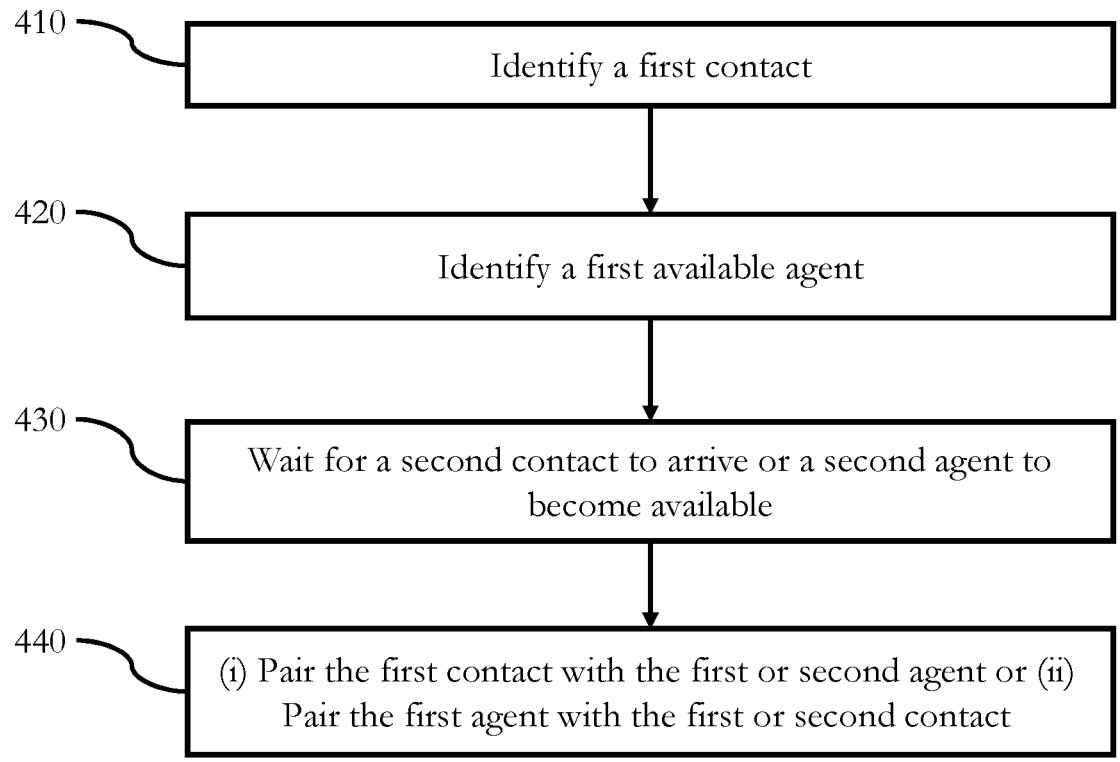
FIG. 4 shows a flow diagram of an L3 pairing method according to embodiments.

FIG. 4 shows a flow diagram of an L3 pairing method 400 according to embodiments. At block 410, a first contact in queue may be identified. In L0 and L1 environments, the first contact may be the only contact waiting in queue.

At block 420, a first available agent may be identified. In L0 and L2 environments, the first available agent may be the only available agent.

At this point, a typical contact center may connect the first contact with the first agent. If the contact center is using a choice-based pairing strategy such as BP, this connection may be suboptimal, and the choice-based pairing strategy will operate at low instant performance or efficiency. Instead, at block 430, the L3 pairing method 400 may wait for a second contact to arrive or a second agent to become available, thereby increasing the amount of choice available to BP or another choice-based pairing strategy. In some situations, this waiting or delay step may result in a contact center that is operating in an L3 environment.

In some embodiments, the L3 pairing method may wait at block 430 for a threshold amount of time, during which more than one contact may arrive or more than one agent may become available. For example, the threshold amount of time is predetermined. In other embodiments, the L3 pairing method may wait at block 430 for up to a maximum amount of time, after which it makes a connection regardless of whether or how much additional choice was made available to the pairing strategy. For example, the maximum amount of time is predetermined.

At block 440, a choice of pairing may be made. In embodiments where the second contact has arrived, the first available agent may be preferably paired with a selected one of at least the first and second contacts. In situations where the second agent has become available, the first contact may be preferably paired with a selected one of at least the first and second agents. In situations where there are multiple agents and multiple contacts (L3), a selected one of at least the first and second agent may be preferably paired with a selected one of at least the first and second contact.

Figure 5:
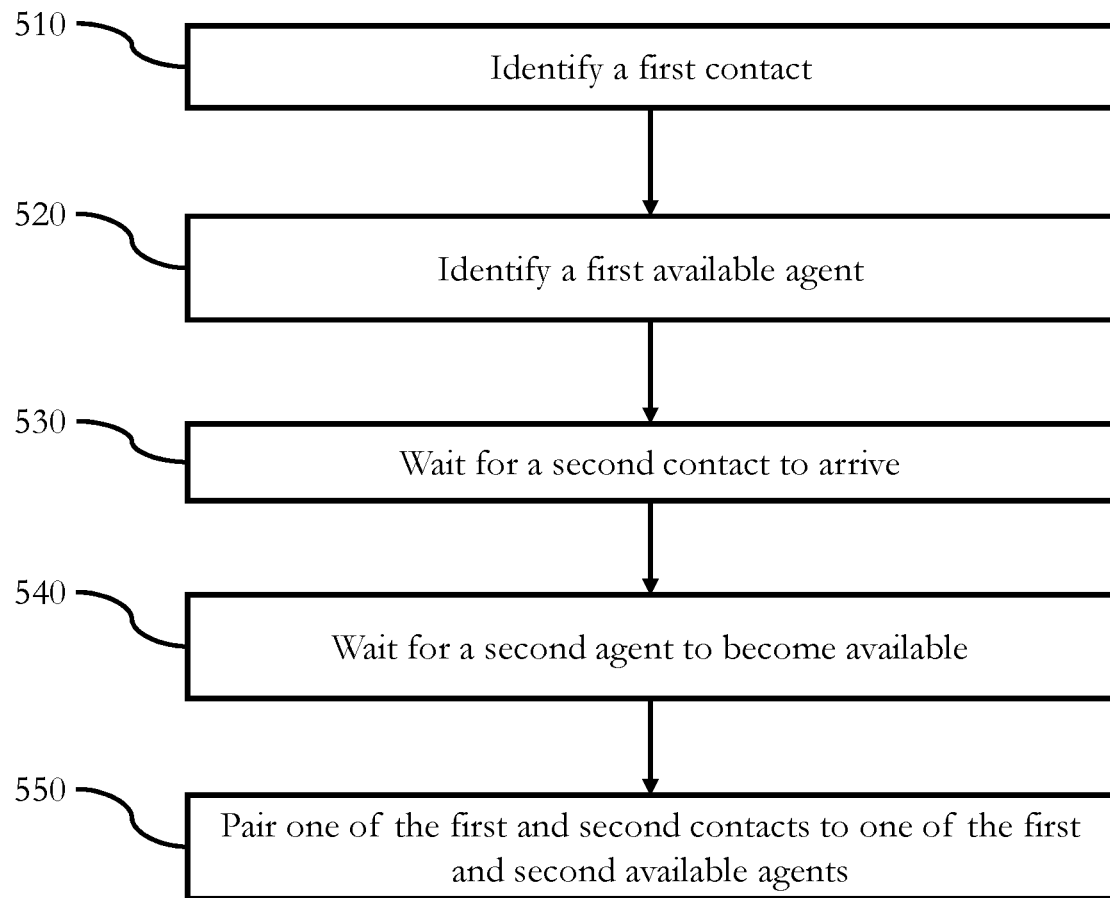
FIG. 5 shows a flow diagram of an L3 pairing method according to embodiments.

FIG. 5 shows a flow diagram of an L3 pairing method 500 according to embodiments. L3 pairing method 500 is similar to L3 pairing method 400 (FIG. 4) insofar as it uses a delay mechanism to increase choice. However, whereas pairing method 400 can result in an L3 environment, pairing method 500 compels an L3 environment.

At block 510, a first contact may be identified.
At block 520, a first available agent may be identified.
At block 530, L3 pairing method 500 may wait for a second contact to arrive, and, at block 540, L3 pairing method 500 may wait for a second agent to arrive, resulting in an L3 environment, in which multiple agents and multiple contacts are available for pairing.

At block 550, in some embodiments, a selected one of at least the first and second contacts may be paired to a selected one of at least the first and second agents. In other embodiments, BP may "batch" pairings, such as by pairing both the first agent with one of the first and second contacts, and the second agent with the other of the first and second contacts. In this way, BP may make multiple high-performance/efficiency pairings at once without further delay. In some embodiments, the contact center system may be able to effect each of these pairings/connections simultaneously, or nearly simultaneously, such as by a single batch instruction from an L3 pairing module. In other embodiments, the L3 pairing module may serialize multiple pairing/connection instructions to effect each of these multiple pairings. The serialized instructions may be made nearly simultaneously such that there is no delay or only minimal delay between routing one connection and the next.

For example, block 550 may provide for pairing the first contact and the first agent, even after L3 pairing method 500 waited for a second contact to arrive, and, at block 540, L3 pairing method 500 waited for a second agent to arrive. Whereas conventional contact centers would consider delaying a possible pairing of the first agent and the first contact to be a waste of contact center resources, the present disclosure provides greater assurance in the accuracy of each selected pairing.

In some embodiments, L3 pairing method 400 described above with respect to FIG. 4 may also be configured to perform batch pairings in situations in which an L3 environment arises.

It is possible for L3 environments to arise without introducing a delay or postponing selecting/choosing a pairing. For example, two or more agents may become available simultaneously or nearly simultaneously when there are multiple contacts in queue, resulting in a transition from L2 to L3. Similarly, two or more contacts may arrive simultaneously or nearly simultaneously, resulting in a transition from L1 to L3. In some contact center systems, the workforce may be instantaneously increased. For example, if there are many contacts waiting in queue, the contact center may modify the pool of logged-in agents to add more than one agent to the pool. Each of these newly-added agents would be available simultaneously or nearly simultaneously, resulting in a transition from L2 to L3.

Figure 6:
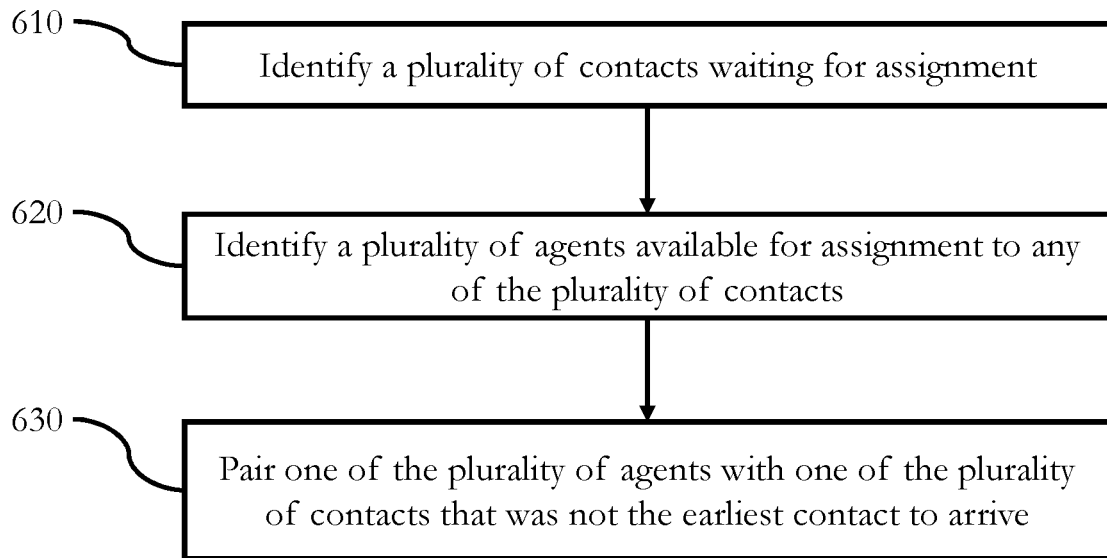
FIG. 6 shows a flow diagram of an L3 pairing method according to embodiments.

FIG. 6 shows a flow diagram of an L3 pairing method 600 according to embodiments. At block 610, a plurality of contacts waiting in queue for assignment may be identified. At block 620, a plurality of agents available for assignment to any (or at least some) of the plurality of contacts may be identified.

Consequently, the contact center is currently in an L3 environment, regardless of whether it was achieved through a delay technique or other circumstances that gave rise to L3. At block 630, in some embodiments, one of the plurality of agents may be paired with one of the plurality of contacts that was not the earliest contact to arrive. In some embodiments, the L3 pairing method 600 may batch-pair multiple agents with multiple contacts, and, in some situations, it may be the case that none of the preferentially paired contacts was the earliest contact to arrive.

Similarly, in some embodiments, one of the plurality of contacts may be paired with one of the plurality of agents that was not the longest-waiting agent (or best-performing agent) that would have been selected according to a FIFO-based fairness metric (or PBR strategy). In some embodiments, the L3 pairing method 600 may batch-pair multiple contacts with multiple agents, and, in some situations, it may be the case none of the preferentially paired agents was the longest-waiting agent (or best-performing agent, etc.).

It is possible for an L3 pairing module to perform or otherwise emulate a FIFO or FIFO-like pairing strategy while the contact center system is an L3 state. In these situations, the L3 pairing module may always pair, for example, the longest-waiting contact (or the higher-priority contact) at the head of the queue with, for example, the longest-waiting agent, regardless of the other contacts in queue and available agents. In this sense, a FIFO pairing strategy is indifferent to L1 (agent surplus), L2 (agent shortage), and L3 (multiple agents and multiple contacts) environments, operating no more or less efficiently as in an L0 state. However, an L3-enabled choice-based pairing strategy such as BP with L3 can operate at higher average performance/efficiency when L1/L2/L3 states with increased choice are possible.

In some embodiments, an L3 pairing module (e.g., L3 pairing module 140) or a similar module may be capable of making an automated workforce management recommendation or decision within the contact center system. For example, instead of preferentially trying to minimize contact hold time and agent free time, which causes the contact center to hover around L0 or in periods of L1 and L2 with limited amounts of choice, the contact center system could be advised or instructed to use a certain number of agents that is likely to keep the contact center system in high-choice environments. In some situations, the recommendation could be to staff additional agents (e.g., 10 additional agents, 100 additional agents, etc.) to increase the expected amount of time spent in high-choice L1. In other situations, the recommendation could be to staff fewer agents (e.g., 10 fewer agents, 100 fewer agents, etc.) to increase the expected amount of time spent in high-choice L2.

In some embodiments, the workforce management instruction or recommendation may balance the cost of employing additional agents and increasing agent free time against the benefit of reducing contact wait time, or balancing the cost-savings of employing fewer agents and decreasing agent free time against the cost of increasing contact wait time. These recommendations may take into account the desired metric to optimize. For example, if the contact center management desires to optimize customer satisfaction, it may desirable to make a recommendation that errs on being in high-choice L1 (agent surplus) rather than high-choice L2 (agent shortage). In either case, the recommendation or instruction may balance the cost of increasing agent free time or increasing contact wait time against the improved performance/efficiency of BP or another choice-based pairing strategy operating in higher-choice L1, L2, or L3 environments, and avoiding inefficient L0 environments in which only a default choice is available.

Figure 7:
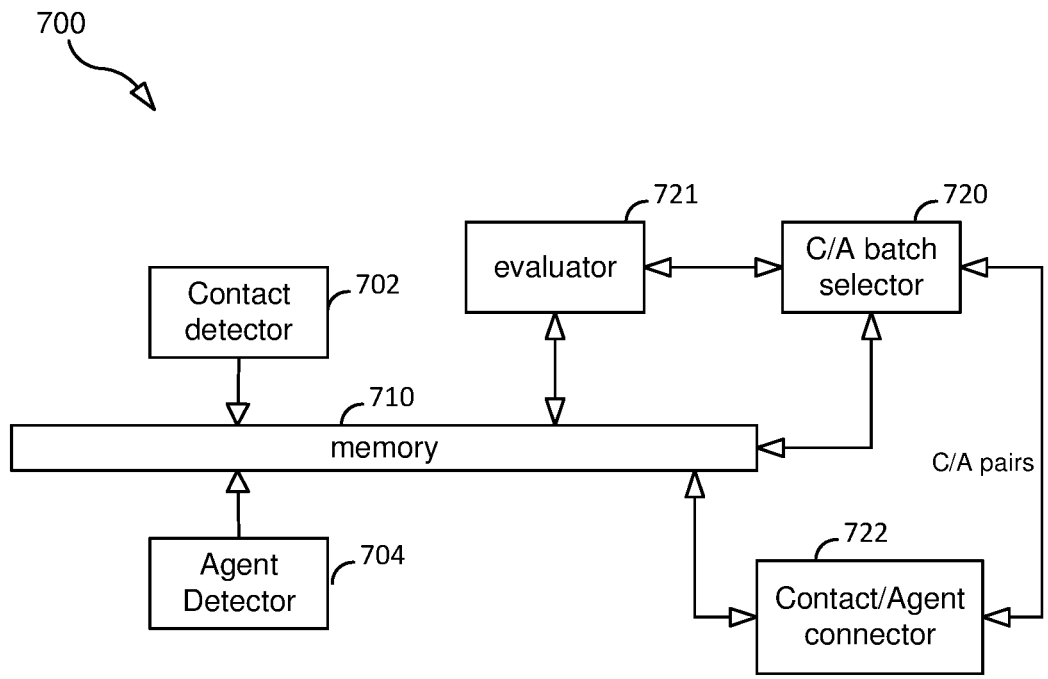
FIG. 7 depicts an L3 pairing module according to embodiments.

FIG. 7 illustrates an example L3 pairing module 700 according to an embodiment (that is, for example, L3 pairing module 140 may be implemented using pairing module 700). In the embodiment shown, pairing module 700 includes a memory 710 (e.g., random access memory RAM) such as dynamic RAM (DRAM) or static RAM (SRAM)) for storing contact center information that identifies: (i) a set of contact identifiers (IDs) associated with contacts available for pairing (i.e., contacts waiting to be connected to an agent) and (ii) a set of agent IDs associated with agents available for pairing. The sets of IDs are "dynamic" because each set may change over time, as discussed herein. In some embodiments, the contact center information includes: i) for each contact ID, metadata for the contact associated with the contact ID (this metadata may include state information indicating whether the contact is available (i.e., waiting to be paired), a score assigned to the contact, and/or information about the contact) and ii) for each agent ID, metadata for the agent associated with the agent ID (this metadata may include state information indicating whether the agent is available, a score assigned to the agent and/or information about the agent). Exemplary information about the contacts and/or agents that may be stored in memory 710 and is associated with the contact ID or agent ID includes: attributes, arrival time, hold time or other duration data, estimated wait time, historical contact-agent interaction data, agent percentiles, contact percentiles, a state (e.g., 'available' when a contact or agent is waiting for a pairing, 'abandoned' when a contact disconnects from the contact center, 'connected' when a contact is connected to an agent or an agent is connected to a contact, 'completed' when a contact has completed an interaction with an agent, 'unavailable' when an agent disconnects from the contact center) and patterns associated with the agents and/or contacts.

Pairing module 700 also includes a contact detector 702 and an agent detector 704. Contact detector 702 is operable to detect an available contact (e.g., contact detector 702 may be in communication with a switch that signals contact detector 702 whenever a new contact calls the contact center) and, in immediate response to detecting the available contact, store in memory 710 at least a contact ID associated with the detected contact (the metadata described above may also be stored in association with the contact ID). Similarly, agent detector 704 is operable to detect when an agent becomes available and, in immediate response to detecting the agent becoming available, store in memory 710 at least an agent identifier uniquely associated with the detected agent (metadata pertaining to the identified agent may also be stored in association with the agent ID). In this way, as soon as a contact/agent becomes available, memory 710 will be updated to include the corresponding contact/agent identifier and state information indicating that the contact/agent is available. Hence, at any given point in time, memory 710 will contain a set of zero or more contact identifiers where each is associated with a different contact waiting to be connected to an agent, and a set of zero or more agent identifiers where each is associated with a different available agent. Pairing module 700 further includes (i) a contact/agent (C/A) batch selector 720 that functions to identify (e.g., based on the state information) sets of available contacts and agents for pairing, and provide state updates (i.e., modify the state information) for contacts and agents once the contacts and agents are selected for pairing and (ii) a C/A pairing evaluator 721 that functions to evaluate information associated with available contacts and information associated with available agents in order to propose contact-agent pairings. As shown in FIG. 7, C/A batch selector 720 is in communication with memory 710, and, thereby, can read from memory 710 the contact center information stored therein (e.g., a set of contact IDs where each contact ID identifies an available contact and a set of agent IDs where each agent ID identifies an available agent). In one embodiment, C/A batch selector 720 is configured to occasionally (e.g., periodically) read memory 710 to obtain a list of available contacts and available agents based on a state associated with the agents and contacts listed in the memory 710. Further, the C/A batch selector 720 is in contact with a C/A pairing evaluator 721, and, after obtaining a list of available contacts and available agents, the C/A batch selector 720 may send the list to the C/A pairing evaluator 721 (e.g., sending contact IDs and agent IDs to the C/A pairing evaluator 721).

After the C/A pairing evaluator 721 receives a set of contact IDs and agent IDs from the C/A batch selector 720, the C/A pairing evaluator 721 may read from memory 710 further information about the received contact IDs and agent IDs. The C/A pairing evaluator 721 uses the read information in order to identify and propose agent-contact pairings for the received contact IDs and agent IDs based on a pairing strategy, which, depending on the pairing strategy used and the available contacts and agents, may result in no contact/agent pairings, a single contact/agent pairing, or a plurality of contact agent pairings.

Upon identifying contact/agent pairing(s), the C/A pairing evaluator 721 sends the set of contact/agent pairing(s) to the batch selector 720. The C/A batch selector 720 provides the set of contact/agent pairing(s) to a contact/agent connector 722 (e.g., if the contact associated with contact ID C12 is paired with the agent associated with the agent ID A7, then C/A batch selector 720 provides these contact/agent IDs to contact/agent connector 722). If the pairing process results in one or more contact/agent pairings, then, for each contact/agent pairing, C/A batch selector 720 will transmits an updated state associated with each contact ID and each agent ID in the one or more contact/agent pairings to memory 710, which is then associated with each contact ID and agent ID. Thereby, memory 710 retains the contact IDs and agent IDs for future analysis.

Contact/agent connector 722 functions to connect the identified agent with the paired identified contact. Further, C/A connector 722 transmits an updated state associated with each contact ID and each agent ID in the one or more contact/agent pairings to memory 710, which is then associated with each contact ID and agent ID.

Therefore, the pairing module 700 provides an asynchronous polling process where memory 710 provides a central repository that is read and updated by the contact detector 702, agent detector 704, C/A batch selector 720, C/A pairing evaluator 721, and C/A connector 722. Accordingly, the objects of each agent and contact do not move between the components of pairing module 700; instead identifiers associated with the objects are transmitted between the contact detector 702, agent detector 704, memory 710, C/A batch selector 720, C/A pairing evaluator 721, and C/A connector 722. This process conserves bandwidth, processing power, memory associated with each module, and is more expedient than conventional event-based pairing modules.

Figure 8A:
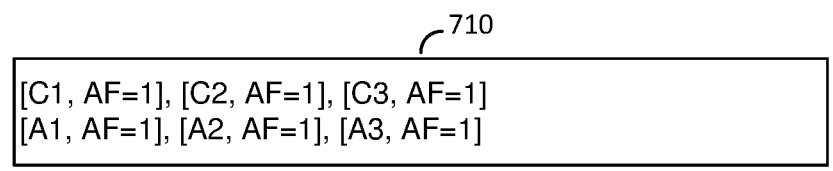
FIG. 8A illustrates a state of the memory at a first point in time.
Figure 8B:
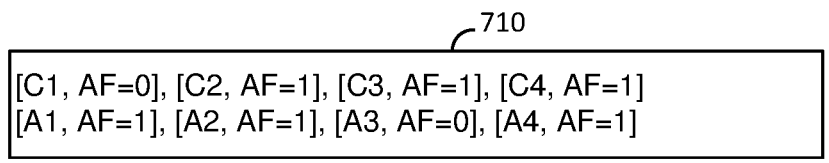
FIG. 8B illustrates a state of the memory at a second point in time.

This feature is illustrated by comparing FIG. 8A with FIG. 8B. FIG. 8A shows the state of memory 710 at time t=t1 according to an embodiment, and FIG. 8B shows the state of memory 710 at time t=t4 according to the embodiment. At time t=t1, C/A batch selector 720 reads memory and obtains a set of contact IDs (C1, C2, C3) where each contact ID is associated with an available contact and a set of agent IDs (A1, A2, A3) where each agent ID is associated with an available agent, and then provides the set of contact IDs and agent IDs to C/A pairing evaluator 721 (or "evaluator" 721 for short). C/A batch selector is able to determine whether a contact ID is associated with an available contact by inspecting the availability-flag (AF) associated with the contact ID (e.g., when AF=1, the contact is available, otherwise the contact is not available). Similarly, C/A batch selector is able to determine whether an agent ID is associated with an available agent by inspecting the AF associated with the agent ID (e.g., when AF=1, the agent is available, otherwise the agent is not available). In this example, after obtaining the contact/agent IDs (e.g., at time t=t2), evaluator 721 decides to pair contact C1 with agent A3 and provides the tuple (C1, A3) to C/A connector 722, via C/A batch selector 720, to effectuate the pairing. C/A connector 722 transmits an updated state to memory 710 for C1 and A3 (e.g., changes the corresponding availability-flags to 0). Therefore, when C/A batch selector 720 next (e.g., at time t=t3) polls memory, C1 and A3 will not be available, and therefore will not be included in the set of contact IDs and the set of agent IDs provided to the C/A pairing evaluator 721. Also at time t=t3, contact detector 702 adds ID C4 to memory 710 and agent detector 704 adds ID A4 to memory 710. Accordingly, at time t=t4 memory 710 includes the following contact IDs: C1, C2, C3, and C4 along with their corresponding availability flags and the following agent IDs: A1, A2, A3, A4 along with their corresponding availability flags. As illustrated by FIG. 8A and FIG. 8B, the system stores contact information (e.g., contact ID and associated AF) that identifies a set of available contact and agent information (e.g., agent ID and associated AF) that identifies a set of available agents.

In one embodiment, C/A batch selector 720 is configured such that, if C/A batch selector 720 reads memory at time t=t1, then C/A batch selector 720 will not read memory again until at least a first threshold amount of time (th1) has passed since time t=t1, but will read memory again by no later than time t=t1+th2, where th2>th1. For example, th1 is predetermined. That is, in some embodiments, when C/A batch selector 720 reads memory at time t=tx, C/A batch selector 720 will read the memory at some point in time between and including tx+th1 and tx+th2.

The tables below illustrate various possible scenarios of a contact center operating according to various embodiments of the present disclosure. These tables demonstrate various combinations of different pairing strategies, and different contact center states (e.g., L1, L2, L3). The present disclosure contemplates any possible combination of contact center states and pairing strategies. That is, when an L1 scenario is illustrated by a Table, the present disclosure contemplates a similar scenario with an L2 scenario (or L3 scenario) instead. Similarly, when an agent becomes available, the present disclosure contemplates another scenario where a contact becomes available, and vice versa.

TABLE 1

| Time | Available Contacts/Agents | Events |
|---|---|---|
| t1 | A1, A2 | |
| t2 | A1, A2 | |
| t3 | A1, A2 | Read memory (e.g., obtain A1, A2) |
| t4 | A1, A2, C1 | Perform Pairing process. Result: no pairings |
| t5 | A1, A2, C1 | |
| t6 | A1, A2, C1, A3 | |
| t7 | A1, A2, C1, A3 | Read memory |
| t8 | A1, A2, C1, A3, A4 | Perform Pairing process. Result: A3/C1 paired. Transmit updated A3/C1 state |
| t9 | A1, A2, A4 | |
| t10 | A1, A2, A4, C2, A5 | |
| t11 | A1, A2, A4, C2, A5, A6 | Read memory |
| t12 | A1, A2, A4, C2, A5, A6, C9 | Perform Pairing process. Result: A2/C2 paired. Transmit updated A2/C2 state. |
| t13 | A1, A4, A5, A6, C9 | |

The scenario illustrated in Table 1 is an L1 scenario as there is always a surplus of agents. As shown in the table, while C1 became available at time t=t4, C1 was not paired with an available agent until time t=t8 because evaluator 721 did not have knowledge that C1 was available until selector 720 read memory 710 again at time t=t7. Evaluator 721 may have used any pairing strategy (e.g., BP, FIFO, or PBR).

TABLE 2

| Time | Available Contacts/Agents | Events |
|---|---|---|
| t1 | A1, A2 | |
| t2 | A1, A2, C1 | |
| t3 | A1, A2, C1 | Read memory (i.e., obtain A1, A2, C1) |
| t4 | A1, A2, C1 | Perform Pairing process. Result: no pairings (e.g., not enough agent choice) |
| t5 | A1, A2, C1 | |
| t6 | A1, A2, C1, A3, A4 | |
| t7 | A1, A2, C1, A3, A4 | Read memory (i.e., obtain A1, A2, A3, A4, C1) |
| t8 | A1, A2, C1, A3, A4 | Perform Pairing process. Result: A1/C1 paired Transmit updated A1/C1 state |
| t9 | A2, A3, A4, C2 | |
| t10 | A2, A3, A4, C2 | |
| t11 | A2, A3, A4, C2 | Read memory |
| t12 | A2, A3, A4, C2, A5 | Perform Pairing process. Result: A2/C2 paired Transmit updated A2/C2 state |

The scenario illustrated in Table 2 is an L1 scenario as there is always a surplus of agents. As shown in the table, while C1 became available at time t=t2, C1 was not paired with an available agent until time t=t8 because evaluator 721 decided there was not enough agent choice. Notably, at time t=t12, evaluator 721 decides to pair A2/C2 because evaluator 721 determined that there was sufficient choice; for example, evaluator 721 may check for a threshold amount of choice (e.g., a threshold number of potential pairings). That is, a potential pairing that was available to evaluator 721 at an earlier time t=t2, may not be selected until a later time t=t8.

In this scenario, the pairing strategy may have been BP, but not conventional pairing strategies such as FIFO or PBR, which typically require pairings to be made as soon as any pairing is available.

TABLE 3

| Time | Available Contacts/Agents | Events |
| --- | --- | --- |
| t1 | A1 | |
| t2 | A1, A2 | |
| t3 | A1, A2 | Read memory (e.g., obtain A1, A2) |
| t4 | A1, A2, C1 | Perform Pairing process. Result: no pairings |
| t5 | A1, A2, C1 | |
| t6 | A1, A2, C1, A3, A4 | |
| t7 | A1, A2, C1, A3, A4 | Read memory |
| t8 | A1, A2, C1, A3, A4 | Perform Pairing process. Result: A1/C1 paired Transmit updated A1/C1 state |
| t9 | A2, A3, A4 | |
| t10 | A2, A3, A4, C2, A5 | |
| t11 | A2, A3, A4, C2, A5 | Read memory |
| t12 | A1, A2, A4, C2, A5, A6, C9 | Perform Pairing process. Result: A2/C2 paired. Transmit updated A2/C2 state. |
| t13 | A3, A4, A5, A6, C9 | |

The scenario illustrated in Table 3 is an L1 scenario as there is always a surplus of agents. As shown in the table, while C1 became available at time t=t4, C1 was not paired with an available agent until time t=t8. In this scenario, the pairing strategy may have been FIFO.

TABLE 4

| Time | Available Contacts/Agents | Events |
| --- | --- | --- |
| t1 | C1, C2 | |
| t2 | C1, C2 | |
| t3 | C1, C2 | Read memory (e.g., obtain C1, C2) |
| t4 | C1, C2, A1 | Perform Pairing process. Result: no pairings |
| t5 | C1, C2, A1 | |
| t6 | C1, C2, A1, C3 | |
| t7 | C1, C2, A1, C3 | Read memory |
| t8 | C1, C2, A1, C3, C4 | Perform Pairing process. Result: C3/A1 paired Transmit updated C3/A1 state |
| t9 | C1, C2, C4 | |
| t10 | C1, C2, C4, A2, C5 | |
| t11 | C1, C2, C4, A2, C5, C6 | Read memory |
| t12 | C1, C2, C4, A2, C5, C6, A9 | Perform Pairing process. Result: C2/A2 paired. Transmit updated C2/A2 state. |
| t13 | C1, C4, C5, C6, A9 | |

The scenario illustrated in Table 4 is an L2 scenario as there is always a surplus of contacts. As shown in the table, while A1 became available at time t=t4, A1 was not paired with an available agent until time t=t8 because evaluator 721 did not have knowledge that A1 was available until selector 720 read memory 710 again at time t=t7. Evaluator 721 may have used any pairing strategy (e.g., BP, FIFO, or PBR).

TABLE 5

| Time | Available Contacts/Agents | Events |
| --- | --- | --- |
| t1 | C1, C2 | |
| t2 | C1, C2, A1 | |
| t3 | C1, C2, A1 | Read memory (i.e., obtain C1, C2, A1) |
| t4 | C1, C2, A1 | Perform Pairing process. Result: no pairings (e.g., not enough agent choice) |
| t5 | C1, C2, A1 | |
| t6 | C1, C2, A1, C3, C4 | |

TABLE 5-continued

| Time | Available Contacts/Agents | Events |
|---|---|---|
| t7 | C1, C2, A1, C3, C4 | Read memory (i.e., obtain C1, C2, C3, C4, A1) |
| t8 | C1, C2, A1, C3, C4 | Perform Pairing process. Result: C1/A1 paired Transmit updated C1/A1 state |
| t9 | C2, C3, C4, A2 | |
| t10 | C2, C3, C4, A2 | |
| t11 | C2, C3, C4, A2 | Read memory |
| t12 | C2, C3, C4, A2, C5 | Perform Pairing process. Result: C3/A2 paired Transmit updated C3/A2 state |

The scenario illustrated in Table 5 is an L2 scenario as there is always a surplus of contacts. As shown in the table, while A1 became available at time t=t2, A1 was not paired with an available contact until time t=t8 because evaluator 721 decided there was not enough contact choice. In this scenario, the pairing strategy may have been BP, but not FIFO or PBR.

TABLE 6

| Time | Available Contacts/Agents | Events |
|---|---|---|
| t1 | C1 | |
| t2 | C1, C2 | |
| t3 | C1, C2 | Read memory (e.g., obtain C1, C2) |
| t4 | C1, C2, A1 | Perform Pairing process. Result: no pairings |
| t5 | C1, C2, A1 | |
| t6 | C1, C2, A1, C3, C4 | |
| t7 | C1, C2, A1, C3, C4 | Read memory |
| t8 | C1, C2, A1, C3, C4 | Perform Pairing process. Result: C1/A1 paired Transmit updated C1/A1 state |
| t9 | C2, C3, C4 | |
| t10 | C2, C3, C4, A2, C5 | |
| t11 | C2, C3, C4, A2, C5 | Read memory |
| t12 | C1, C2, C4, A2, C5, C6, A9 | Perform Pairing process. Result: C2/A2 paired. Transmit updated C2/A2 state. |
| t13 | C3, C4, C5, C6, A9 | |

The scenario illustrated in Table 6 is an L2 scenario as there is always a surplus of contacts. As shown in the table, while A1 became available at time t=t4, A1 was not paired with an available agent until time t=t8. In this scenario, the pairing strategy may have been any pairing strategy (e.g., BP, FIFO, or PBR).

TABLE 7

| Time | Available Contacts/Agents | Events |
|---|---|---|
| t1 | A1, A2 | Read memory (e.g., obtain A1, A2) |
| t2 | A1, A2 | Perform Pairing process. Result: no pairings |
| t3 | A1, A2, C1, C2 | |
| t4 | A1, A2, C1, C2, C3, C4, C5 | Read memory (e.g., obtain A1, A2, C1-C5) |
| t5 | A1, A2, C1, C2, C3, C4, C5 | Perform Pairing process. Result: A1/C5 and A2/C3 and transmit updated states for A1, A2, C3, C5 |
| t6 | A3, A4, C1, C2, C4, C6 | |
| t7 | A3, A4, C1, C2, C4, C6 | Read memory |
| t8 | A3, A4, C1, C2, C4, C6 | Perform Pairing process. Result: C2/A4 paired Transmit updated C2/A4 state |
| t9 | A3, C1, C4, C6 | |
| t10 | A3, A1, C1, C4, C6, C7 | |
| t11 | A3, A1, C1, C4, C6, C7 | Read memory |
| t12 | A3, A1, A2, C1, C4, C6, C7, C8 | Perform Pairing process. Result: C1/A2 paired. Transmit updated C1/A2 state. |
| t13 | A3, A1, C4, C6, C7, C8 | |

The scenario illustrated in Table 7 is an L3 scenario in which BP or PBR may have been the pairing strategy.

TABLE 8

| Time | Available Contacts/Agents | Events |
| --- | --- | --- |
| t1 | A1, A2, C1, C2 | Read memory (i.e., obtain A1, A2, C1, C2) |
| t2 | A1, A2, C1, C2 | Perform Pairing process. Result: no pairings (e.g., not enough agent choice) |
| t3 | A1, A2, A3, A4, C1, C2, C3, C4 | |
| t4 | A1, A2, A3, A4, C1, C2, C3, C4 | Read memory |
| t5 | A1, A2, A3, A4, C1, C2, C3, C4 | Perform pairing process. Result A1/C2, A2/C3. Transmit updated states for A1, A2, C2, C3 |
| t6 | A3, A4, A5, A6, C1, C4, C5, C6 | |
| t7 | A3, A4, A5, A6, C1, C4, C5, C6 | Read memory |
| t8 | A3, A4, A5, A6, C1, C4, C5, C6 | Perform Pairing process. Result: A3/C1, A4/C4, A5/C6 paired. Transmit updated states for A3, A4, A5, C4, C6 |
| t9 | A6, A7, C5, C7 | |
| t10 | A6, A7, C5, C7 | Read memory (i.e. obtain A6, A7, C5, C7) |
| t11 | A2, A6, A7, A8, A9, C5, C7, C8, C9 | Perform Pairing process. Result: no pairing (e.g., not enough agent choice because only two agents A6 and A7 were read from memory) |
| t12 | A2, A6, A7, A8, A9, C5, C7, C8, C9 | |

The scenario illustrated in Table 8 is an L3 scenario. In this scenario, the pairing strategy may have been BP, but not FIFO or PBR.

TABLE 9

| Time | Available Contacts/Agents | Events |
| --- | --- | --- |
| t1 | A1, A2, C1, C2 | Read memory (i.e., obtain A1, A2, C1, C2) |
| t2 | A1, A2, C1, C2, A3, C3 | Perform Pairing process. Result: A1/C1 and A2/C2. Transmit updated states for A1, A2, C1, C2 |
| t3 | A3, C3 | |
| t4 | A3, C3 | Read memory |
| t5 | A3, C3, A4, C4 | Perform pairing process. Result A3/C3. Transmit updated states for A3, C3. |
| t6 | A4, C4, A5, C5 | |
| t7 | A4, C4, A5, C5 | Read memory |
| t8 | A4, C4, A5, C5, A6, C6 | Perform Pairing process. Result: A4/C4, A5/C5. Transmit updated states for A4, A5, A5, C4, C5 |
| t9 | A6, C6 | |

The scenario illustrated in Table 9 is an L3 scenario. In this scenario, the pairing strategy may have been FIFO or any other pairing strategy.

TABLE 10

| Time | Available Contacts/Agents | Events |
| --- | --- | --- |
| t1 | C1, C2 | Read memory (i.e., obtain C1, C2) |
| t2 | A1, A2, C1, C2, A3, C3 | Perform Pairing process. Result: No Pairing |
| t3 | A1, A2, C1, C2, A3, C3 | |
| t4 | A1, A2, C1, C2, A3, C3, C4, C5 | Read memory |
| t5 | A1, A2, C1, C2, A3, C3, C4, C5, C6 | Perform pairing process. Result A2/C3. Transmit updated states for A2, C3. |
| t6 | A1, C1, C2, C3, C4, C5, C6, A3, C7 | |
| t7 | A1, C1, C2, C3, C4, C5, C6, A3, C7, C8 | Read memory |
| t8 | A1, C1, C2, C3, C4, C5, C6, A3, C7, C8, C9 | Perform Pairing process. Result: A1/C4, A3/C5. Transmit updated states for A1, A3, C4, C5 |
| t9 | C1, C2, C3, C6, C7, C8, C9 | |

In this scenario, at time t0 the contact center was in L2 state, but then moved to L3 state by time t2. The pairing strategy may have been BP.

TABLE 11

| Time | Available Contacts/Agents | Events |
|---|---|---|
| t1 | C1, C2, A1 | Read memory (i.e., obtain C1, C2) |
| t2 | A2, C2, A3, C3 | Perform Pairing process. Result: A1/C1. Transmit updated states for A1, C1. |
| t3 | A2, C2, A3, C3 | |
| t4 | A2, C2, A3, C3, C4, C5 | Read memory |
| t5 | A2, C2, A3, C3, C4, C5, C6 | Perform pairing process. Result: A2/C2, A3/C4. Transmit updated states for A2, A3, C2, C4. |
| t6 | C3, C5, C6, A4, C7, | |
| t7 | C3, C4, C5, C6, A4, C7, C8 | Read memory |
| t8 | C3, C4, C5, C6, A4, C7, C8, C9 | Perform Pairing process. Result: A4/C5. Transmit updated states for A3, C5 |
| t9 | C3, C4, C6, C7, C8, C9 | |

In this scenario, at time t0 the contact center was in L2 state, but then moved to L3 state by time t2. The contact center returns to an L2 state at t=t6. At every pairing process, all available agents are paired with a contact.

Figure 9:
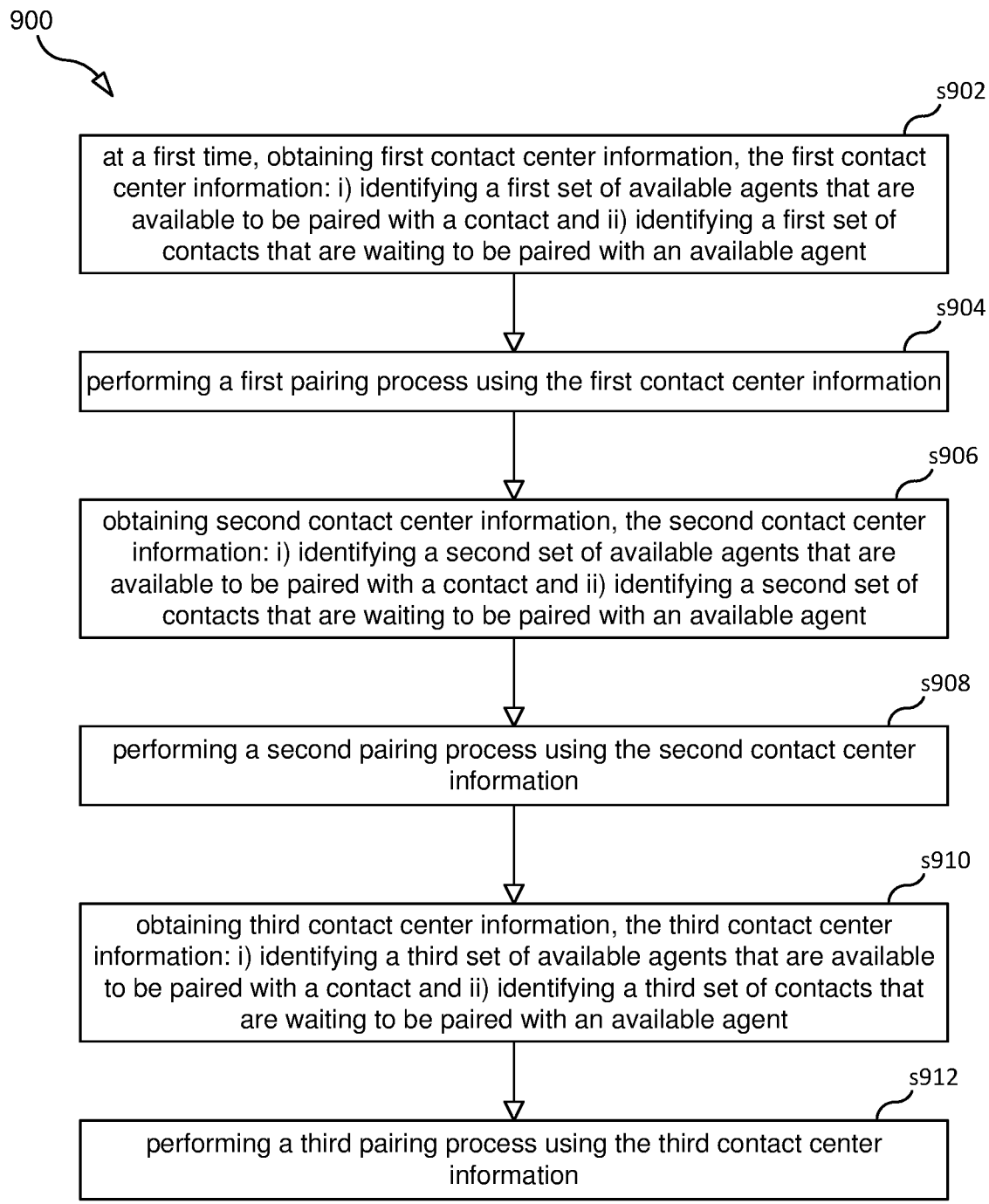
FIG. 9 shows a flow diagram of a pairing method according to embodiments.

FIG. 9 is a flowchart illustrating a process 900 according to an embodiment. Process 900 may begin in step s902.

Step s902 comprises, at a first time, obtaining first contact center information (e.g., obtaining from memory 710 the set of contact IDs and the set of agent IDs), where the first contact center information identifies i) a first set of available agents that are available to be paired with a contact (this could be an empty set—i.e., no agents are available) and ii) a first set of available contacts that are waiting to be paired with an available agent, the first set of available contacts comprising a first contact.

Step s904 comprises, after obtaining the first contact center information, performing a first pairing process (e.g., BP, FIFO, PBR) using the first contact center information.

Step s906 comprises, at a second time after performing the first pairing process, obtaining second contact center information, the second contact center information: i) identifying a second set of available agents that are available to be paired with a contact, the second set of available agents comprising a first agent and ii) identifying a second set of available contacts that are waiting to be paired with an available agent, the second set of available contacts comprising the first contact.

Step s908 comprises, after obtaining the second contact center information, performing a second pairing process (e.g., BP, FIFO, PBR) using the second contact center information, wherein the performance of the second pairing process results in a pairing of the first contact with the first agent. This second pairing process may use the same pairing strategy as the first pairing process or the second pairing process may use a different pairing strategy. For example, step s904 may use FIFO, while step s908 uses BP. In another example, step s904 may use BP with a first percentile ranking, while step s908 uses BP with a second percentile ranking, different from the first percentile ranking. In another example, step s904 may use a diagonal method BP pairing strategy, while step s908 uses an off-diagonal, or network flow, BP pairing strategy.

Step s910 comprises, at a third time after performing the second pairing process, obtaining third contact center information, the third contact center information: i) identifying a third set of available agents that are available to be paired with a contact and ii) identifying a third set of available contacts that are waiting to be paired with an available agent.

Step s912 comprises, after obtaining the third contact center information, performing a third pairing process using the third contact center information.

The amount of time between the first time and the second time is: i) at least a predetermined threshold amount of time, ii) not more than a predetermined maximum amount of time, or iii) both, and the amount of time between the second time and the third time is: i) at least the predetermined threshold amount of time, ii) not more than the predetermined maximum amount of time, or iii) both.

In some embodiments, the first set of available agents comprises the first agent.

In some embodiments, the second set of available contacts comprises the first contact and a second contact.

In some embodiments, the first contact became available for pairing closer to the first time than the second time.

In some embodiments, the predetermined threshold amount of time or the predetermined maximum amount of time is based on at least one of: i) the total number of agents included in the first set of available agents or ii) the total number of contacts included in the first set of available contacts.

In some embodiments, pairing the first contact to the first agent occurs at a fourth time between the second time and the third time.

In some embodiments, pairing the first contact to the first agent occurs at a fourth time after the third time.

Figure 10:
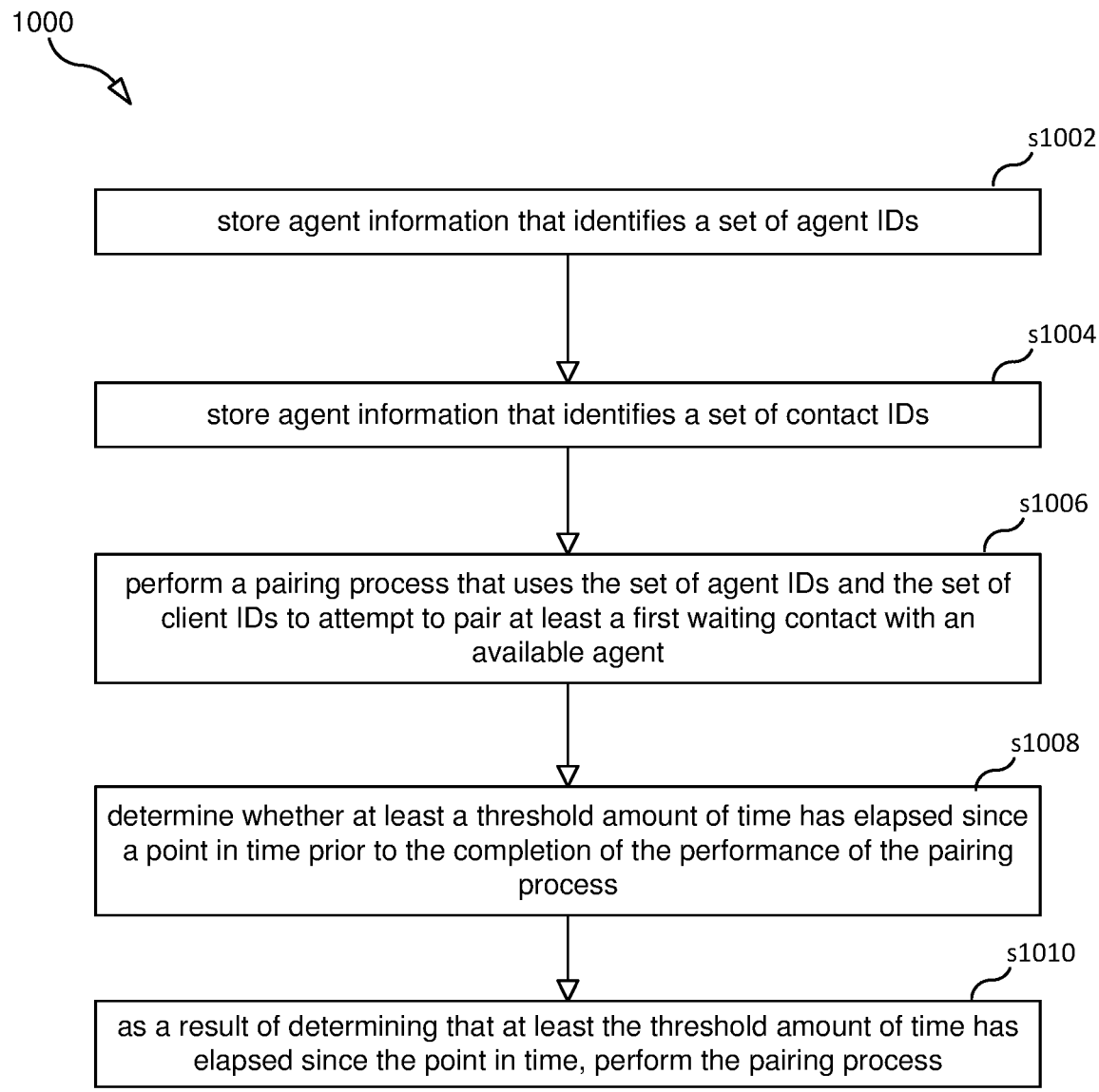
FIG. 10 shows a flow diagram of a pairing method according to embodiments.

FIG. 10 is a flowchart illustrating a process 1000 according to an embodiment. Process 1000 may being in step s1002.

Step s1002 comprises storing agent information that identifies a set of agent IDs, each agent ID included in the set of agent IDs being associated with a different available agent.

Step s1004 comprises storing contact information that identifies a set of contact IDs, each contact ID included in the set of contact IDs being associated with a different contact waiting to be connected with an available agent.

Step s1006 comprises performing a pairing process that uses the set of agent IDs and the set of client IDs to attempt to pair at least a first waiting contact with an available agent.

Step s1008 comprises, after performing the pairing process, determining whether at least a threshold amount of time has elapsed since a point in time prior to the completion of the performance of the pairing process.

Step s1010 comprises, as a result of determining that at least the threshold amount of time has elapsed since the point in time, performing the pairing process again.

In some embodiments, the system is further configured such that, if, as a result of the pairing process a particular contact is paired with a particular agent, then, prior to performing the paring process again, the system i) updates the state of the agent ID associated with the particular agent and ii) updates the state of the client ID associated with the particular client.

In some embodiments, the pairing process comprises: selecting a contact ID from the set of contact IDs and choosing one of the agent IDs based information associated with the selected contact ID.

In some embodiments, the information associated with the selected contact ID is a numeric value, each agent ID included in the set of agent IDs is associated with a numeric value, and choosing one of the agent IDs based on the numeric value associated with the selected contact ID comprises choosing, from among the set of agent IDs, the agent ID having a numeric value that is the closest to the numeric value associated with the contact ID.

In some embodiments, the pairing process comprises selecting an agent ID from the set of agent IDs and choosing one of the contact IDs based information associated with the selected agent ID.

At this point it should be noted that L3 pairing in a contact center system in accordance with the present disclosure as described above may involve the processing of input data and the generation of output data to some extent. This input data processing and output data generation may be implemented in hardware or software. For example, specific electronic components may be employed in an L3 pairing module or similar or related circuitry for implementing the functions associated with L3 pairing in a contact center system in accordance with the present disclosure as described above. Alternatively, one or more processors operating in accordance with instructions may implement the functions associated with BP in a contact center system in accordance with the present disclosure as described above. If such is the case, it is within the scope that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit as described herein.

The invention claimed is:

1. A method comprising:
obtaining a first set of one or more contact IDs each identifying a contact;
obtaining a first set of one or more agent IDs each identifying an agent;
delaying pairing of any contact ID in the first set with any agent ID in the first set for at least a first predefined time interval;
based at least on the delaying, obtaining a first updated set of one or more contact IDs each identifying a contact;
based at least on the delaying, obtaining a first updated set of one or more agent IDs each identifying an agent; and
using a behavioral pairing strategy, pairing at least one contact ID in the first updated set with at least one agent ID in the first updated set.

2. The method of claim 1, wherein the method further comprises:
based on a number of contact IDs included in the first set and/or a number of agent IDs included in the first set, determining the first predefined time interval.

3. The method of claim 1, wherein the method further comprises:
after pairing said at least one contact ID in the first updated set with said at least one agent ID in the first updated set, obtaining a second updated set of one or more contact IDs each identifying a contact; and
obtaining a second updated set of one or more agent IDs each identifying an agent;
instead of attempting to pair any contact ID included in the second updated set with any agent ID included in the second updated set, delaying the pairing for at least a second predefined time interval;
obtaining a third updated set of one or more contact IDs each identifying a contact;
obtaining a third updated set of one or more agent IDs each identifying an agent; and
using the behavioral pairing strategy, pairing at least one contact ID in the third updated set with at least one agent ID in the third updated set.

4. The method of claim 3, wherein the method further comprises:
based on a number of contact IDs included in the second updated set and/or a number of agent IDs included in the second updated set, determining the second predefined time interval.

5. The method of claim 3, wherein the first predefined time interval and the second predefined time interval are the same.

6. The method of claim 1, wherein delaying the pairing for at least the first predefined time interval comprises:
delaying the pairing for at least the first predefined time interval but not more than a predefined maximum time limit.

7. A system comprising:
memory; and
processing circuitry coupled to the memory, wherein the system is configured to:
obtain a first set of one or more contact IDs each identifying a contact;
obtain a first set of one or more agent IDs each identifying an agent;
delay pairing of any contact ID in the first set with any agent ID in the first set for at least a first predefined time interval;
based at least on the delaying, obtain a first updated set of one or more contact IDs each identifying a contact;
based at least on the delaying, obtain a first updated set of one or more agent IDs each identifying an agent; and
using a behavioral pairing strategy, pair at least one contact ID in the first updated set with at least one agent ID in the first updated set.

8. The system of claim 7, wherein the method further comprises:
based on a number of contact IDs included in the first set and/or a number of agent IDs included in the first set, determining the first predefined time interval.

9. The system of claim 7, wherein the method further comprises:
after pairing said at least one contact ID in the first updated set with said at least one agent ID in the first updated set, obtaining a second updated set of one or more contact IDs each identifying a contact; and
obtaining a second updated set of one or more agent IDs each identifying an agent;
instead of attempting to pair any contact ID included in the second updated set with any agent ID included in the second updated set, delaying the pairing for at least a second predefined time interval;
obtaining a third updated set of one or more contact IDs each identifying a contact;
obtaining a third updated set of one or more agent IDs each identifying an agent; and
using the behavioral pairing strategy, pairing at least one contact ID in the third updated set with at least one agent ID in the third updated set.

10. The system of claim 9, wherein the method further comprises:
based on a number of contact IDs included in the second updated set and/or a number of agent IDs included in the second updated set, determining the second predefined time interval.

11. The system of claim 9, wherein the first predefined time interval and the second predefined time interval are the same.

12. The system of claim 7, wherein delaying the pairing for at least the first predefined time interval comprises:
delaying the pairing for at least the first predefined time interval but not more than a predefined maximum time limit.

13. A computer program product comprising a non-transitory computer readable medium storing instructions which when executed by processing circuitry of a system causes the system to:
obtain a first set of one or more contact IDs each identifying a contact;
obtain a first set of one or more agent IDs each identifying an agent;
delay pairing of any contact ID in the first set with any agent ID in the first set for at least a first predefined time interval;
based at least on the delaying, obtain a first updated set of one or more contact IDs each identifying a contact;
based at least on the delaying, obtain a first updated set of one or more agent IDs each identifying an agent; and
using a behavioral pairing strategy, pair at least one contact ID in the first updated set with at least one agent ID in the first updated set.

14. The computer program product of claim 13, wherein the method further comprises:
based on a number of contact IDs included in the first set and/or a number of agent IDs included in the first set, determining the first predefined time interval.

15. The computer program product of claim 13, wherein the method further comprises:
after pairing said at least one contact ID in the first updated set with said at least one agent ID in the first updated set,
obtaining a second updated set of one or more contact IDs each identifying a contact; and
obtaining a second updated set of one or more agent IDs each identifying an agent;
instead of attempting to pair any contact ID included in the second updated set with any agent ID included in the second updated set, delaying the pairing for at least a second predefined time interval;
obtaining a third updated set of one or more contact IDs each identifying a contact;
obtaining a third updated set of one or more agent IDs each identifying an agent; and
using the behavioral pairing strategy, pairing at least one contact ID in the third updated set with at least one agent ID in the third updated set.

16. The computer program product of claim 15, wherein the method further comprises:
based on a number of contact IDs included in the second updated set and/or a number of agent IDs included in the second updated set, determining the second predefined time interval.

17. The computer program product of claim 15, wherein the first predefined time interval and the second predefined time interval are the same.

18. The computer program product of claim 13, wherein delaying the pairing for at least the first predefined time interval comprises:
delaying the pairing for at least the first predefined time interval but not more than a predefined maximum time limit.

* * * * *